July 29, 1952  H. B. PEARSON  2,605,177
MANUFACTURE OF COMBUSTIBLE GAS
Filed Sept. 2, 1949  2 SHEETS—SHEET 2
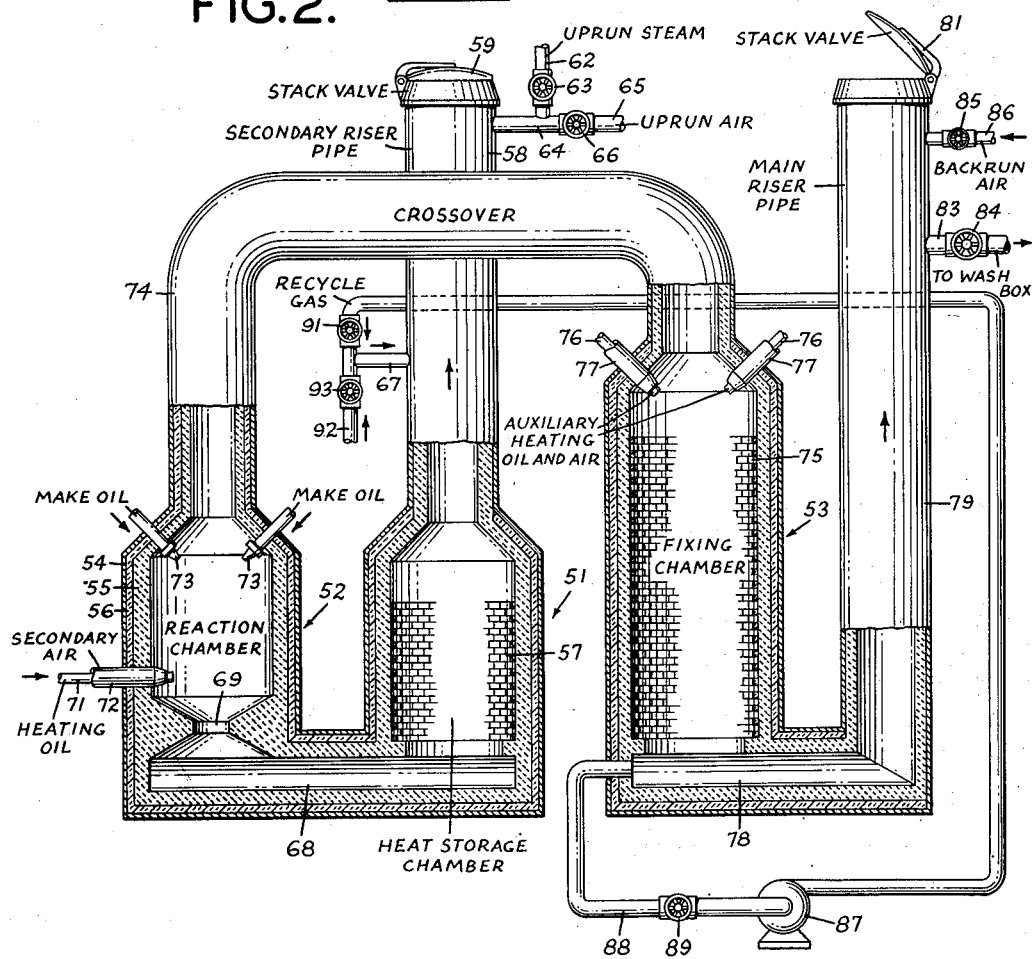
INVENTOR.
HARRY B. PEARSON
BY *Alvin Engelstein*
ATTORNEY.

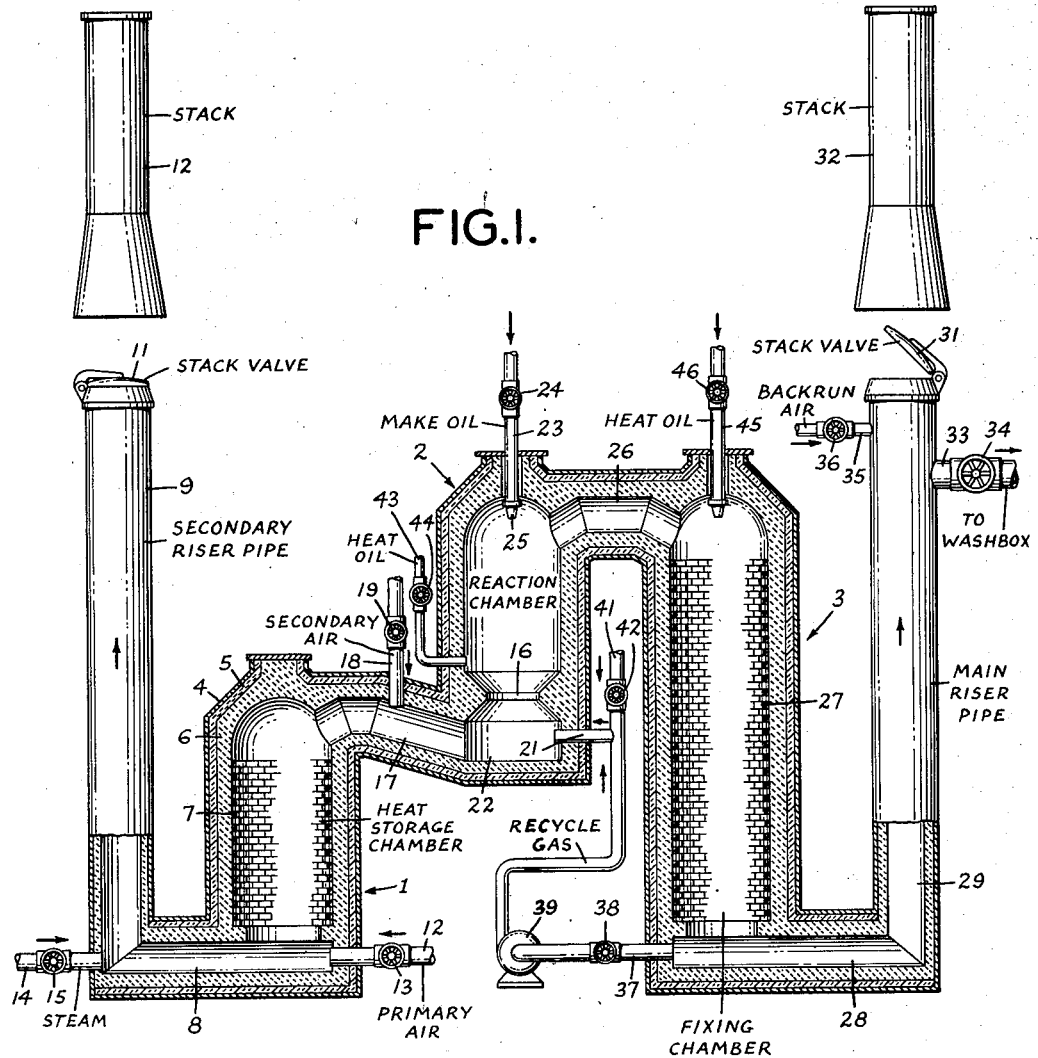

Patented July 29, 1952

2,605,177

UNITED STATES PATENT OFFICE 2,605,177

MANUFACTURE OF COMBUSTIBLE GAS

Harry B. Pearson, New York, N. Y., assignor to Allied Chemical & Dye Corporation, New York, N. Y., a corporation of New York Application September 2, 1949, Serial No. 113,766

9 Claims. (Cl. 48—214)

This invention relates to the manufacture of fuel gas from hydrocarbons and more particularly refers to a new and improved process and apparatus for converting normally liquid hydrocarbon oils and condensible hydrocarbon gases into a highly combustible homogeneous gas of a quality adapted to be principally used for heating.

In my copending U. S. application filed September 2, 1949, Serial No. 113,765, I have described a four chamber reverse directional flow system for the production of combustible gas from fluid hydrocarbon charging materials. The present invention is directed to an essentially unidirectional flow operation involving three primary zones to effect pyrolytic decomposition of hydrocarbon charging stock into combustible gas.

There are many factors which enter into the successful commercial manufacture of oil gas, among which are production of a fuel gas of uniform quality with the proper combustion characteristics, ability to produce a gas having a B. t. u. per cu. ft. in excess of 800–950 and a specific gravity (air=1) between about 0.6 and 0.8, preferably below 0.70, such gas designated as high B. t. u. low gravity gas, ability to crack less costly fractions of petroleum oils such as low gravity gas oils or heavy cracked residua, capability of quickly, continuously producing gas from hydrocarbon oil and conversely shutting down in a simple, expeditious manner, and utilization of an oil-cracking device, economical in construction and compact in design.

One object of the present invention is to provide an efficient process for converting hydrocarbon oil into high B. t. u. low gravity gas.

Another object of this invention is to provide a gas producing process utilizing low-grade petroleum oils as raw charging stock with the elimination of by-product carbon.

A further object is to provide a low cost oil gas apparatus compact in design and durable in operation.

Further objects and advantages will be apparent from the description and accompanying drawings.

Apparatus for carrying out the conversion of oil into gas in accordance with the present invention involves a combination of elements including a heat storage chamber adapted to store and give up heat by means of contained refractory materials having voids therebetween to permit the passage of gas therethrough, a vertical riser pipe extending above and connected at its base to the bottom of the heat storage chamber for the discharge of waste gas, a stack valve fitted to the top of the riser pipe, an inlet near the bottom of the heat storage chamber for the introduction of primary air, an inlet for the introduction of steam into the heat storage chamber, a refractory lined empty reaction chamber having an orifice near its bottom through which gases flowing through the reaction chamber must pass, a refractory lined gas channel connecting the top of the heat storage chamber with the bottom of the reaction chamber at a point below the orifice, an inlet for introduction of secondary air into the base of the reaction chamber, a heat oil inlet disposed near the bottom of the reaction chamber at a point above the orifice, a gas inlet for the introduction of hydrocarbon carrier gas into the base of the reaction chamber, a downwardly directed spray nozzle near the top of the reaction chamber for the dispersion of make oil, a refractory lined fixing chamber containing refractory material with voids therebetween to permit the passage of gas therethrough, a refractory lined conduit connecting the tops of the reaction chamber and the fixing chamber, a second vertical refractory lined riser pipe extending upwardly to a height above the fixing chamber and connected to its base, a stack valve fitted to the top of the second riser pipe, a make gas discharge line leading from the second riser pipe, and an air inlet into the second riser pipe for introduction of backrun air.

A modified form of apparatus includes a heat storage chamber adapted to store heat and give up heat by means of contained refractory materials having voids therebetween to permit the passage of gas therethrough, a vertical riser pipe disposed above and extending from the top of the heat storage chamber, a stack valve fitted to the top of the riser pipe, inlets for the introduction of steam, uprun air and hydrocarbon carrier gas into the riser pipe, a refractory lined empty reaction chamber having an orifice near its bottom through which gases flowing through the reaction chamber must pass, a refractory lined gas channel connecting the bottom of the heat storage chamber with the bottom of the reaction chamber at a point below the orifice, an inlet for the introduction of secondary air into the base of the reaction chamber, a heat oil inlet disposed near the bottom of the reaction chamber at a point above the orifice, a downwardly directed spray nozzle near the top of the reaction chamber for the dispersion of make oil, a refractory lined fixing chamber containing refractory material with voids therebetween to permit the passage of gas therethrough, auxiliary heat oil and air inlets leading into the top of the fixing chamber, a refractory lined conduit connecting the tops of the reaction chamber and the fixing chamber, a second vertical refractory lined riser pipe extending upwardly to a height above the fixing chamber and connected to its base, a stack valve fitted to the top of the second riser pipe, a make gas discharge line leading from the second riser pipe, and an air inlet into the second riser pipe for the introduction of backrun air.

One method of operation involves passing air through a first zone at least partially filled with heated refractory material with voids therebetween to permit the passage of air therethrough thereby preheating the air, introducing the preheated air upwardly into a second empty zone in direct contact with a combustible material which burns in the presence of the preheated air thus imparting heat to the walls of the second zone; passing the combustion gases resulting from the reaction of the combustible material and air downwardly through a third zone at least partially filled with refractory material with voids therebetween to permit the passage of gas therethrough thereby transferring heat from the combustion gases to the refractory material, and discharging the combustion gas from the third zone; passing steam upwardly through the first zone, admixing a hydrocarbon carrier gas with the steam and introducing the mixture into the bottom of the second zone, simultaneously injecting hydrocarbon charging stock into the second zone countercurrent to the upward flow of steam and hydrocarbon carrier gas maintained at a velocity sufficiently high to prevent passage of carbonaceous material downwardly out of the second zone, withdrawing gaseous constituents substantially free from solid and liquid carbonaceous materials from the top of the second zone, directing them downwardly through the third zone thereby fixing the gases, and discharging the gaseous constituents from the third zone.

A specific embodiment of the process comprises heating the apparatus to a gas-cracking temperature by passing air downwardly through a previously heated refractory lined riser pipe thereby effecting partial heating of the air, thence downwardly through heated checkerbrick contained in a first chamber thereby effecting further heating of the air, passing the preheated air from the bottom of the first chamber containing checkerbrick into the bottom of an empty chamber wherein secondary air is admitted and heating oil is introduced, which latter burns thus imparting heat to the walls of the second empty chamber, then directing the combustion gases through a gas channel to the top of and downwardly through a third chamber containing checkerbrick thereby heating the checkerbrick therein, and discharging the combustion gases to the atmosphere through a second riser pipe leading from the base of the third chamber; admitting steam into the first riser pipe downwardly through the first zone, upwardly through the second zone, downwardly through the third zone and out through the second riser pipe thereby purging the system of combustion gases, introducing steam and hydrocarbon carrier gas into the first riser pipe downwardly through the checkerbrick of the first chamber, thence discharging through an orifice upwardly into the second empty reaction chamber countercurrent to downwardly sprayed make oil, maintaining the velocity of the mixture of steam and hydrocarbon carrier gas sufficiently high to prevent the passage of oil vapors and carbon downwardly through the orifice, withdrawing gaseous constituents substantially free of solid carbonaceous material and liquid oil from the top of the empty reaction chamber through a gas channel into the top of a third chamber, then passing the gaseous constituents downwardly through the third chamber containing the heated refractory material thereby fixing the gas, passing the gaseous constituents from the bottom of the third chamber upwardly through the second riser pipe, and discharging the gaseous constituents from the second riser pipe; purging the system of gaseous constituents by passing steam followed by uprun air through the first riser pipe, down through the first chamber, up through the second chamber, down through the third chamber, and up through the second riser pipe; injecting backrun air into the top of the second riser pipe, up through the fixing chamber, down through the reaction chamber, up through the first chamber, and exhausting the combustion gases resulting from burning carbon deposits in the chambers to the atmosphere through the first riser pipe thereby restoring heat to the refractories in the first chamber.

In an alternative method of operation primary air passes upwardly through heated refractories contained in a first chamber thereby preheating the air, commingling the preheated air with secondary air and discharging it into the bottom of a second empty chamber wherein heating oil is introduced, which latter burns thus imparting heat to the walls of the second chamber, directing the resultant combustion gases together with excess air to the top of a third chamber wherein supplemental heat oil is introduced which burns to generate additional combustion gases, passing the products of combustion downwardly through a third chamber containing refractory materials with voids therebetween to permit the passage of gas thereby transferring heat from the combustion gases to the refractories, and discharging the combustion gases to the atmosphere through a second riser pipe leading from the base of the third chamber; passing uprun steam upwardly through the first and second chambers, downwardly through the third chamber and upwardly through the second riser pipe thereby purging the system of products of combustion; passing steam upwardly through the refractories in the first chamber, commingling a hydrocarbon carrier gas with the steam, thence discharging the mixture of steam and hydrocarbon carrier gas through an orifice upwardly into the second empty chamber countercurrent to downwardly sprayed make oil, maintaining the velocity of the mixture of steam and hydrocarbon carrier gas sufficiently high to prevent passage of oil vapors and carbon downwardly through the orifice, withdrawing gaseous constituents substantially free of solid carbonaceous material and liquid oil from the top of the empty chamber through a gas channel into the top of the third chamber, then passing the gaseous constituents downwardly through the third chamber thereby fixing the gas, passing the gaseous constituents from the bottom of the third chamber through the second riser pipe, and discharging them from the second riser pipe; purging the system of gaseous constituents by the introduction of steam followed by uprun air upwardly through the first and second chambers, downwardly through the third chamber and out through the second riser pipe; injecting backrun air into the second riser pipe, upwardly through the third chamber, downwardly through the second and first chambers, and exhausting the waste gases to the atmosphere through the first riser pipe thereby restoring heat to the refractories in the first chamber.

The accompanying drawings are diagrammatic flow sheets illustrating the process and apparatus of the present invention.

Referring to Fig. 1, heat storage chamber 1, reaction chamber 2, fixing chamber 3 and connecting conduits are preferably constructed of a metal shell 4 lined with insulation 5 and suitable refractory material 6 such as firebrick or tiles which absorbs heat and also protects the metal shell 4 from the direct impact of hot gases. Contained in heat storage chamber 1 are refractory materials or firebrick 7 with voids therebetween to permit the flow of gases therethrough. Firebrick 7 functions to absorb heat from hot combustion gases passing therethrough during one stage of the operation and gives up its stored heat to uprun air during a blast period and superheats steam during a make period. Combustion gases resulting from the flow of backrun air discharge from the bottom of heat storage chamber 1 through conduit 8 into the base of secondary riser pipe 9, out through open stack valve 11 into stack 12. Primary air, the source of oxidizing medium for burning combustible material to bring the equipment to gas-cracking temperatures, may be introduced into the base of chamber 1 through line 12 and valve 13. Steam for use during the make period may be supplied through line 14 and valve 15.

A circular orifice 16 disposed near the bottom of empty reaction chamber 2 imparts velocity to the gases flowing up therethrough thereby preventing any carbonaceous solid and liquid materials dropping down and accumulating on the bottom of the chamber 2. Gas crossover 17 connects the top of chamber 1 with the bottom of reaction chamber 2 at a point below orifice 16. Secondary air may conveniently be supplied through line 18 and valve 19. Hydrocarbon carrier gas to be added in advance of orifice 16 flows through line 21. Mixing of gases prior to entering orifice 16 may readily be accomplished by utilizing the small cavity 22 below orifice 16 for this purpose. Make oil pumped through line 23 and valve 24 sprays downwardly through nozzle 25 near the top of chamber 2 in a direction counter-current to the mixture of steam and hydrocarbon carrier gas entering through orifice 16.

The tops of chambers 2 and 3 are joined by channel 26 for conducting gases therebetween. Fixing chamber 3 is desirably almost completely filled with spaced refractories or firebrick 27 to permit the free passage of gases therethrough. Gases entering or leaving the bottom of chamber 3 flow through conduit 28 which is connected at its other end to the base of main riser pipe 29. During a blast period combustion gases are vented from the top of riser pipe 29 through open stack valve 31 into stack 32 and thence to the atmosphere. Stack valve 31 remains closed when on a make period and the fuel gas discharges through line 33 and valve 34 to conventional washbox, not shown in the drawing. Backrun air may be introduced at the top of riser pipe 29 through line 35 and valve 36. In the preferred operation a portion of the make gas may be utilized as the hydrocarbon carrier gas and recycled via line 37, valve 38, exhauster 39, line 21 into the bottom of reaction chamber 2, or normally gaseous hydrocarbon gas from an external source may be added through line 41 and valve 42.

In most instances the heat liberated during the blast period by burning the carbon deposits resulting from the pyrolytic decomposition of the hydrocarbon charging stock is insufficient to bring the temperatures in the reaction chamber 2 and fixing chamber 3 high enough to effect rapid cracking. Therefore, heat oil from an external source may be introduced into chamber 2 preferably near its bottom through line 43 and valve 44. Control of the temperature in fixing chamber 3 relative to the temperature in reaction chamber 2 can be obtained by the introduction of regulated amounts of heat oil into the top of chamber 3 through line 45 and valve 46.

A complete cycle of operation starting with the make period will now be described.

Steam enters line 14 at the base of riser pipe 9, passes through conduit 8 and then moves upwardly through checkerbrick section 7 extracting stored heat therefrom to become highly superheated and expanded. Superheated steam from the top of chamber 1 flows through channel 17 into the bottom cavity 22 of reaction chamber 2 where it commingles with a hydrocarbon carrier gas entering through line 21. The mixture of superheated steam and hydrocarbon carrier gas discharges through orifice 16 upwardly in chamber 2 countercurrent to downwardly sprayed make oil ejected through nozzle 25. A linear velocity in excess of about 50 feet per second of the mixture of steam and carrier gas through orifice 16 will be found to retard downward flow of carbonaceous material into cavity 22 which carbonaceous material if permitted to settle therein would rapidly accumulate and clog the apparatus. As a result of a previous blasting operation the refractory walls of chamber 2 are at a gas-making temperature, generally between 1500° F. and 2200° F. In chamber 2 almost instantaneous vaporization of the make oil ejected through nozzle 25 occurs and simultaneously cracking of the oil proceeds, both actions causing the liberation of substantial amounts of carbon from the oil. I have found that the downward injection of make oil countercurrent to the upward flow of steam and gas at a sufficiently high velocity to prevent passage of carbonaceous material downwardly through the orifice and the removal of vaporous and gaseous constituents from the top of the reaction chamber "traps" residual carbonaceous materials in the chamber leaving effluent gaseous constituents substantially free from solid and liquid carbonaceous material. Further, I have found that the carbonaceous material adheres to the internal surface of the empty reaction chamber out of the path of the flowing stream of fluids through the process thereby preventing plugging up of the apparatus and promoting continuity of operation without material reduction in capacity or shutting down for cleaning. As a result of vaporization and cracking of the charging oil in the empty reaction chamber due to the high gas-cracking temperature therein and aided by the passage of relatively large volumes of hydrocarbon carrier gas and steam, generally more than 75% of the carbonaceous material formed in the process by the conversion of the oil is retained in the empty reaction chamber. Only "clean" gases and vapors, i. e. substantially free from carbon and heavy carbon forming materials are subjected to further reaction in the fixing chamber 3. In this manner deposition of carbon on checkerbrick section 27 of fixing chamber 3 is materially reduced with the attendant advantages of avoiding clogging of its interstices and minimizing spalling commonly caused by sharp temperature differentials and flame temperatures resulting from burning of heavy deposits of carbon thereon. A further reaction occurs in chamber 2 between the incandescent carbon formed by the pyrolytic decomposition of the oil and the steam passing upwardly through chamber 2 in direct contact with the carbon to produce blue gas thus utilizing the carbon to produce useful fuel gas and relieving the sytem of part of carbon formed in the process.

Although a wide variety of charging stocks ranging from L. P. gas to heavy liquid hydrocarbons may be cracked into fuel gas in accordance with the present invention, my process is particularly applicable to the conversion of low-grade hydrocarbon oils such as heavy cracked residua having a Conradson carbon number in excess of 10 into high B. t. u. low gravity gas without accumulating carbon in the system.

Conversion of the gases and vapors leaving the top of chamber 2 is completed by their downward passage through refractory materials 27 previously heated to a suitable gas-cracking temperature. Since the gases and vapors passing through chamber 3 are relatively free from solid and liquid carbon forming constituents and considerable cracking has already occurred in empty reaction chamber 12, the amount of carbon deposited on checkerbrick section 27 is small and readily removed in a subsequent blast operation with air. Reaction products flow from the bottom of chamber 3 through channel 28 and refractory lined main riser pipe 29 to give up some of their heat and thence discharge through line 33 and valve 34 to the washbox to be treated in a conventional manner.

The hydrocarbon carrier gas consisting of methane, ethane, propane or mixtures thereof introduced into chamber 2 through line 41, valve 42 and line 21 may be obtained from an external source. In the preferred operation a portion of the make gas preferably between 10 and 35% of the volume of make gas is recycled via line 37, valve 38, exhauster 39 and line 21. The use of make gas as the hydrocarbon carrier gas has the important advantage of degrading the higher molecular weight hydrocarbon gases thus reducing the percentage of illuminants in the final gas and lowering its specific gravity. Although the drawing illustrates the return of make gas from the bottom of fixing chamber 3, it may be withdrawn from any convenient point beyond reaction chamber 2, as for example crossover 26, channel 28, riser pipe 29 or line 33. Furthermore a steam injector may be employed in lieu of a gas exhauster for the introduction of recycle make gas.

At the end of the make period the introduction of make oil is stopped by closing valve 24 and recycling of hydrocarbon carrier gas terminated by shutting valve 38 and the unit purged by continuing the introduction of steam through line 14 until the gaseous constituents are forced out of the system through line 33 and valve 34 by the incoming steam thereby recovering such gases. Blue gas formed by the reaction of steam and carbon may also be recovered by blowing uprun air introduced through line 12 into the system and out through line 33. Immediately following the purging operation, backrun air injected through line 35 and valve 36 passes downwardly through main riser pipe 29, upwardly through fixing chamber 3, down through reaction chambers 2 and 1, up through secondary riser pipe 9 and exhausts to the atmosphere through open stack valve 11. The passage of backrun air will eliminate most of the carbon deposits on checkerbrick 27 and part of the carbon deposit on the walls of reaction chamber 2. The hot products of combustion resulting from burning carbon flow down through heat storage chamber 1 to restore heat in checkerbrick 7 for subsequently preheating uprun air and superheating uprun steam. The flow of backrun air is then stopped and stack valve 11 closed and stack valve 31 opened. Primary air admitted through line 12 and valve 13 passes upwardly through checkerbrick 7 thereby preheating the air and discharges the preheated air from the top of chamber 1 through conduit 17 into the bottom of empty chamber 2. In order to avoid cooling refractory 7 to a temperature which is too low for superheating steam during the make period it is generally desirable to introduce a portion of the air as secondary air through line 18 and valve 19 at a point beyond heat storage chamber 1. In this manner the amount of heat stored by checkerbrick 7 can be distributed between preheating air and superheating steam in any desired proportion. Preheated air rises upwardly through orifice 16 meeting a stream of heat oil or other suitable fluid combustible material which ignites generating heat and bringing refractory walls of the empty reaction chamber to a suitable cracking temperature. An excess of air is provided for burning carbonaceous deposits from the walls of chamber 2 made during the previous make period, which resultant heat also is imparted to the refractory lining of chamber 2 thereby conserving fuel. Combustion gases together with highly heated excess secondary air pass through crossover 26, downwardly through chamber 3 in direct contact with checkerbrick 27 thus transferring heat to the checkerbrick. If the combustion gases are insufficient in volume or temperature to bring refractories 27 to the desired gas-cracking temperature auxiliary fuel may be added through line 45 and valve 46. In practice I have found that a downward passage of hot combustion gases to heat checkerbrick 27 in fixing chamber 2 results in a relatively even downward temperature gradient following the path of combustion gases and a more uniform heat distribution throughout the checkerbrick section with more uniform cracking conditions existing therein thereby minimizing overcracking and undercracking of the oil vapors during the make period. Waste combustion gases leaving fixing chamber 3 are vented to the atmosphere through channel 28, riser pipe 29 and stack valve 31.

In order to avoid diluting the gas product with inert combustion gases contained in the system upon completion of the blast period it is desirable to purge the unit before starting the make period. Purging may be accomplished by simply blowing steam through line 14 and valve 15 into the unit and exhausting the gases to the atmosphere through stack valve 31. The cycle of operation starting with the make period may then be repeated.

A modified form of apparatus with an alternative method of operation illustrated in Fig. 2 has three primary zones, namely heat storage chamber 51, reaction chamber 52 and fixing chamber 53 each having an outer metal shell 54, a refractory lining 55 and a layer of insulation 56 between them. Heat storage chamber 51 contains checkerbrick 57 which stores heat extracted from hot combustion gas passing in direct contact with the checkerbrick and gives up heat to uprun air and steam during blast and make periods. A vertical secondary riser pipe 58 extending from and connected to the top of chamber 51 serves to exhaust combustion gas through stack valve 59 and stack 61 above it. Secondary riser pipe 58 may also be utilized as the entrance for uprun steam through line 62, valve 63 and line 64, uprun air through line 65 and valve 66, and hydrocarbon carrier gas through line 67. A gas channel 68 connects the bottom of heat storage chamber 51 with the bottom of reaction chamber 52 which latter is unimpeded by filling of any kind other than a circular refractory orifice 69 disposed a short distance from the bottom of chamber 52 for the purpose of imparting a high velocity to gases flowing up through the chamber. Heating oil and secondary air to support combustion are introduced through respective lines 71 and 72 into reaction chamber 52 preferably near the bottom. At the top of reaction chamber 52 are nozzles 73 which direct sprays of make oil downwardly countercurrent to a stream of steam and hydrocarbon carrier gas. Gases are transferred between chambers 52 and 53 through a refractory lined crossover 74 connecting their tops. Fixing chamber 53 containing refractory section 75 is provided with auxiliary heating oil and air lines 76 and 77, respectively, for adding additional heat to the checkerbrick section. A refractory lined crossover 78 joins the bottom of fixing chamber 53 with the base of main riser pipe 79. Waste gases are discharged to the atmosphere through stack valve 81 fitted on top of riser pipe 79 into stack 82. During the make period the product gas discharges from riser pipe 79 through line 83 and valve 84 to washbox. Backrun air flows into the system through line 85 and valve 86. Recycle make gas may be returned by exhauster 87 through line 88, valve 89 and 91 and line 67 into secondary riser pipe 58. If hydrocarbon carrier gas from an external source be employed it may be injected through line 92 and valve 93.

A cycle of operation as diagrammatically shown in Fig. 2 involves passing uprun air through line 65, valve 66 and line 64, downwardly through secondary riser pipe 58 and heat storage chamber 51 thereby preheating the air. The preheated air passes through conduit 68 into the bottom of empty chamber 52 wherein secondary air and heating oil are introduced, which latter burns thus heating the refractory lined walls of chamber 52 to a suitable gas-checking temperature. Excess air burns carbonaceous materials deposited on the walls of chamber 52 furnishing additional heat and removing accumulations of carbon. The products of combustion are transferred through crossover 74 into the top of fixing chamber 53 at which point supplemental heat may be supplied by the introduction of auxiliary heating oil and air through lines 76 and 77. The hot products of combustion passing down through chamber 53 raise the temperature of the checkerbrick section 75 to a suitable gas-cracking temperature. Spent gases are discharged to the atmosphere through conduit 78, main riser pipe 79 and open stack valve 81.

In order to avoid contamination of the make gas with products of combustion the unit is purged by passing uprun steam through line 62, valve 63, line 64, downwardly through secondary riser pipe 58 and heat storage chamber 51, across channel 68, up reaction chamber 52, over crossover 74, down through fixing chamber 53, across conduit 78, up main riser pipe 79 and out through stack valve 81.

A make period follows purging the system of combustion gas and involves passing a mixture of steam introduced through line 62, valve 63, line 64 and hydrocarbon carrier gas entering through line 67 into secondary riser pipe 58, downwardly in direct contact with heated checkerbrick section 57 thereby superheating the steam, thence through channel 68, up through orifice 69 near the bottom of empty reaction chamber 52, upwardly countercurrent to downwardly sprayed make oil discharging through nozzles 73, and out through crossover 74 into the top of fixing chamber 53. Carbonaceous deposits formed by vaporization and pyrolytic decomposition of the make oil adhere to the walls of reaction chamber 52 and in part are consumed by reaction with steam to form blue gas. The mixture of gases substantially free from solid and liquid carbonaceous materials are fixed by passing through checkerbrick section 75 maintained at a gas-cracking temperature. The resulting fuel gas discharges from the bottom of fixing chamber 53, through conduit 78, main riser pipe 79 and out through line 83 and valve 84 to washbox for conventional treatment. A portion of the make gas is recycled via line 88, valve 89, exhauster 87, valve 91 and line 67 into secondary riser pipe 58 wherein it commingles with the steam. In addition to the other advantages obtained by the use of hydrocarbon carrier gas it serves the useful function of effecting better distribution of the oil vapors and oil gas undergoing further conversion in the fixing chamber 53 thereby aiding in minimizing overcracking and undercracking.

Although not a preferred method of operation, the introduction of a carrier gas may be dispensed with entirely and steam in the absence of carrier gas employed as the propelling medium during the make periods. In some instances in the operation of the process, the introduction of carrier gas may be omitted during certain of the make periods or during part of the make periods. For example, during the first part of a make period the quantity of make gas produced may be so small as to make it difficult to recycle make gas at the initial stage of the make period and therefore the return of make gas may desirably be delayed for, by way of illustration, the first 30 seconds. Also, due to special circumstances an operator may wish to limit the degradation of make gas normally accomplished by recycling in which event no make gas would be recycled or make gas returned only during a part of the make time.

To avoid an explosion hazard by the introduction of blast air into the unit containing combustible gas at the end of the make period steam may be blown through line 62 to displace the combustible gas discharging it through line 83. In this manner the oil gas contained in the system is recovered and contamination of the atmosphere by discharge thereto is avoided. Steam and blue gas remaining in the unit may be forced out by passing uprun air through line 65 and out through line 83.

In order to restore heat to the checkerbrick section 57, backrun air is injected through line 85 and valve 86, down through main riser pipe 79, up through fixing chamber 53, down through reaction chamber 52 during which course a portion of the carbonaceous deposits made during the make period are burned and the resultant hot combustion gases entering the bottom of heat storage chamber 51 give up their heat to refractories 57 before discharge to the atmosphere through secondary riser pipe 58 and open stack valve 59. The cycle of operation may now be repeated starting with the blast period.

The time for each cycle will vary dependent upon the nature of the charging oil, operation conditions and quality of gas desired. Blast and make periods of from 3-10 minutes' duration will ordinarily be found satisfactory. High superatmospheric or subatmospheric pressures are unnecessary since the operation of my process may be carried out efficiently at substantially atmospheric pressure.

Although certain preferred embodiments of the invention have been disclosed for purpose of illustration it will be evident that various changes and modifications may be made therein without departing from the scope and spirit of the invention.

I claim:

1. A process for the production of combustible gas which comprises passing air through a first zone containing heated refractory material with voids therebetween to permit the passage of air therethrough thereby preheating the air, introducing the preheated air upwardly into a second empty zone in direct contact with a combustible material which burns in the presence of the preheated air thus imparting heat to the walls of the second zone, passing the combustion gases resulting from the oxidation of the combustible material with air downwardly through a third zone containing refractory material with voids therebetween to permit the passage of gas therethrough thereby transferring heat from the combustion gases to the refractory material, and discharging the combustion gases from the third zone; passing steam through the first zone thereby expanding and superheating the steam, admixing a hydrocarbon carrier gas with the steam and introducing the mixture into the bottom of the second zone, simultaneously injecting hydrocarbon charging stock into the second zone countercurrent to the upward flow of steam and hydrocarbon carrier gas maintained at a velocity sufficiently high to prevent passage of carbonaceous material downwardly out of the second zone, withdrawing gaseous constituents substantially free from solid and liquid carbonaceous materials from the top of the second zone, directing them downwardly through the third zone thereby fixing the gases, recycling a portion of the gaseous constituents for introduction into the second zone as the hydrocarbon carrier gas and discharging the gaseous constituents from the third zone.

2. A process for the production of combustible gas which comprises passing air through a first zone containing heated refractory material with voids therebetween to permit the passage of air therethrough thereby preheating the air, introducing the preheated air upwardly into a second empty zone in direct contact with a combustible material which burns in the presence of the preheated air thus imparting heat to the walls of the second zone, passing the combustion gases resulting from the oxidation of the combustible material with air downwardly through a third zone containing refractory material with voids therebetween to permit the passage of gas therethrough thereby transferring heat from the combustion gases to the refractory material, and discharging the combustion gases from the third zone; passing steam through the first zone thereby expanding and superheating the steam, introducing the superheated steam upwardly into the second empty zone at a velocity sufficiently high to substantially prevent passage of carbonaceous material downwardly out of the second zone, simultaneously injecting hydrocarbon charging stock downwardly countercurrent to the upward flow of said steam into said second empty zone previously heated to a temperature sufficiently high to effect substantially complete vaporization and partial cracking of the hydrocarbon charging stock in said second empty zone thereby entrapping the bulk of the components which form carbon deposits in said second empty zone, withdrawing gaseous constituents substantially free from solid and liquid carbonaceous materials from the top of the second empty zone, directing them downwardly through the third zone thereby fixing the gases, and discharging the gaseous constituents from the third zone.

3. A process for the production of combustible gas which comprises passing air through a first zone containing heated refractory material with voids therebetween to permit the passage of air therethrough thereby preheating the air, introducing the preheated air upwardly into a second empty zone in direct contact with a combustible material which burns in the presence of the preheated air thus imparting heat to the walls of the second zone, passing the combustion gases resulting from the oxidation of the combustible material with air downwardly through a third zone containing refractory material with voids therebetween to permit the passage of gas therethrough thereby transferring heat from the combustion gases to the refractory material, and discharging the combustion gases from the third zone; passing steam through the first zone thereby expanding and superheating the steam, introducing a hydrocarbon carrier gas into the second empty zone, passing the mixture of hydrocarbon carrier gas and steam upwardly through the second empty zone at a velocity sufficiently high to prevent passage of carbonaceous material downwardly out of the second zone, simultaneously injecting hydrocarbon charging stock downwardly countercurrent to the upward flow of said mixture of steam and hydrocarbon carrier gas in said second empty zone previously heated to a temperature sufficiently high to effect substantially complete vaporization and partial cracking of the hydrocarbon charging stock in said second empty zone thereby entrapping the bulk of the components which form carbon deposits in said second empty zone, withdrawing gaseous constituents substantially free from solid and liquid carbonaceous materials from the top of the second empty zone, directing them downwardly through the third zone thereby fixing the gases, and discharging the gaseous constituents from the third zone.

4. A process for the production of combustible gas which comprises passing air through a first zone containing heated refractory material with voids therebetween to permit the passage of air therethrough thereby preheating the air, introducing the preheated air upwardly into a second empty zone in direct contact with a combustible material which burns in the presence of the preheated air thus imparting heat to the walls of the second zone, passing the combustion gases resulting from the oxidation of the combustible material with air downwardly through a third zone containing refractory material with voids therebetween to permit the passage of gas therethrough thereby transferring heat from the combustion gases to the refractory material, and discharging the combustion gases from the third zone; passing steam through the first, second and third zones thereby purging the system of products of combustion; passing steam through the first zone thereby expanding and superheating the steam, introducing the superheated steam upwardly into the second empty zone at a velocity sufficiently high to prevent passage of carbonaceous material downwardly out of the second zone, simultaneously injecting hydrocarbon charging stock downwardly countercurrent to the upward flow of said steam into said second empty zone previously heated to a temperature sufficiently high to effect substantially complete vaporization and partial cracking of the hydrocarbon charging stock in said second empty zone thereby entrapping the bulk of the components which form carbon deposits in said second empty zone, withdrawing gaseous constituents substantially free from solid and liquid carbonaceous materials from the top of the second empty zone, directing them downwardly through the third zone thereby fixing the gases, and discharging the gaseous constituents from the third zone; passing steam through the first, second and third zones thereby displacing the gaseous constituents in the system; passing backrun air upwardly through the third zone, downwardly through the second zone thereby burning a portion of the carbonaceous material deposited in the second and third zones during the pyrolytic conversion of the hydrocarbon charging stock, thence passing the resultant combustion gases through the first zone thereby restoring heat to the refractories therein, and discharging the combustion gases from the first zone.

5. Apparatus for converting hydrocarbons into combustible gas which comprises the combination of a first chamber at least partially filled with a refractory mass adapted to store and give up heat, said mass having voids therein to permit the passage of gas therethrough, a second empty refractory lined reaction chamber having an orifice disposed near its bottom through which gases from the first chamber flowing through the empty chamber must pass, connecting means for conducting gases from the first chamber to the bottom of the second empty chamber at a point below the orifice, a third chamber at least partially filled with a refractory mass having voids therein to permit the passage of gas therethrough, a gas channel connecting the tops of the second and third chambers, two riser pipes extending upwardly to a height above the chambers with one riser pipe connected to the first chamber and the other riser pipe connected at its base to the bottom of the third chamber, inlets for the introduction of air and steam into the first chamber, an inlet for the introduction of a combustible fluid into the second chamber at a point above the orifice, a spray nozzle near the top of the second chamber for the injection of hydrocarbon charging stock, and an inlet for the passage of backrun air through the third, second and first chambers.

6. Apparatus for converting hydrocarbons into combustible gas which comprises the combination of a first chamber at least partially filled with a refractory mass adapted to store and give up heat, said mass having voids therein to permit the passage of gas therethrough, a second empty refractory lined reaction chamber having an orifice disposed near its bottom through which gases flowing through the empty chamber must pass, connecting means for conducting gases from the first chamber to the bottom of the second empty chamber at a point below the orifice, a third chamber at least partially filled with a refractory mass having voids therein to permit the passage of gas therethrough, a gas channel connecting the tops of the second and third chambers, two riser pipes extending upwardly to a height above the chambers with one riser pipe connected at its base to the first chamber and the other riser pipe connected at its base to the bottom of the third chamber, inlets for the introduction of air and steam into the bottom of the first chamber, an inlet for the introduction of a combustible fluid into the second chamber at a point above the orifice, a spray nozzle near the top of the second chamber for the injection of hydrocarbon charging stock, and an inlet for the passage of backrun air through the third, second and first chambers.

7. Apparatus for converting hydrocarbon oil into oil gas which comprises a heat storage chamber containing a refractory mass with voids therebetween to permit the passage of gas therethrough, an empty refractory lined reaction chamber, connecting means for passing gases from the heat storage chamber to the bottom of the empty reaction chamber, a fixing chamber containing a refractory mass with voids therebetween to permit the passage of gas therethrough, a gas channel connecting the tops of the empty reaction chamber and the fixing chamber, two riser pipes extending upwardly to a height above the chambers with one riser pipe connected at its base to the heat storage chamber and the other riser pipe connected at its base to the bottom of the fixing chamber, inlets for the introduction of steam and air into the heat storage chamber, a spray nozzle near the top of the empty reaction chamber for the downward injection of hydrocarbon oil, an inlet for the passage of backrun air through the fixing chamber, the reaction chamber and the heat storage chamber, and a connecting conduit for the return of recycle gas from a point beyond the reaction chamber to the bottom of the reaction chamber.

8. Apparatus for converting hydrocarbon oil into combustible gas which comprises a heat storage chamber adapted to store and give up heat by means of contained refractory materials having voids therebetween to permit the passage of gas therethrough, a vertical riser pipe extending above and connected at its base to the bottom of the heat storage chamber for the discharge of waste gas, a stack valve fitted to the top of the riser pipe, an inlet near the bottom of the heat storage chamber for the introduction of primary air, an inlet for the introduction of steam into the heat storage chamber, a refractory lined empty reaction chamber having an orifice near its bottom through which gases flowing through the reaction chamber must pass, a refractory lined gas channel connecting the top of the heat storage chamber with the bottom of the reaction chamber at a point below the orifice, an inlet for the introduction of secondary air into the base of the reaction chamber, a heat oil inlet disposed near the bottom of the reaction chamber at a point above the orifice, a gas inlet for the introduction of hydrocarbon carrier gas into the base of the reaction chamber at a point below the orifice, a downwardly directed spray nozzle near the top of the reaction chamber for the dispersion of make oil, a refractory lined fixing chamber containing a refractory mass with voids therebetween to permit the passage of gas therethrough, a refractory lined conduit connecting the tops of the reaction chamber and the fixing chamber, a second vertical refractory lined riser pipe extending upwardly to a height above the fixing chamber and connected to its base, a stack valve fitted to the top of the second riser pipe, a make gas discharge line leading from the second riser pipe, and an air inlet into the second riser pipe for the introduction of backrun air.

9. Apparatus for converting hydrocarbon oil into combustible gas which comprises a heat storage chamber adapted to store heat and give up heat by means of contained refractory materials having voids therebetween to permit the passage of gas therethrough, a vertical riser pipe disposed above and extending from the top of the heat storage chamber, a stack valve fitted to the top of the riser pipe, inlets for the introduction of steam, uprun air and hydrocarbon carrier gas into the riser pipe, a refractory lined empty reaction chamber having an orifice near its bottom through which gases flowing through the reaction chamber must pass, a refractory lined gas channel connecting the bottom of the heat storage chamber with the bottom of the reaction chamber at a point below the orifice, an inlet for the introduction of secondary air into the reaction chamber, a heat oil inlet disposed near the bottom of the reaction chamber at a point above the orifice, a downwardly directed nozzle near the top of the empty reaction chamber for the dispersion of make oil, a refractory lined chamber containing refractory material with voids therebetween to permit the passage of gas therethrough, auxiliary heat oil and air inlets leading into the top of the fixing chamber, a refractory lined conduit connecting the tops of the reaction chamber and the fixing chamber, a second vertical riser pipe extending upwardly to a height above the fixing chamber and connected to its base, a stack valve fitted to the top of the second riser pipe, a make gas discharge line leading from the second riser pipe, and an air inlet into the second riser pipe for the introduction of backrun air.

HARRY B. PEARSON.

REFERENCES CITED

The following references are of record in the file of this patent:

UNITED STATES PATENTS

| Number | Name | Date |
| --- | --- | --- |
| 1,644,146 | Pike | Oct. 4, 1927 |
| 1,821,333 | Tolman | Sept. 1, 1931 |
| 2,131,696 | Brandegee et al. | Sept. 27, 1938 |
| 2,174,196 | Rogers | Sept. 26, 1939 |
| 2,218,266 | Pearson | Oct. 15, 1940 |
| 2,267,434 | Tenney | Dec. 23, 1941 |
| 2,494,576 | Odell | Jan. 17, 1950 |